(12) United States Patent
Johnson et al.

(10) Patent No.: US 6,747,441 B2
(45) Date of Patent: Jun. 8, 2004

(54) NON-SYNCHRONOUS SWITCHING REGULATOR WITH IMPROVED OUTPUT REGULATION AT LIGHT OR LOW LOADS

(75) Inventors: Alan Michael Johnson, Richardson, TX (US); Thomas L. Fowler, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/224,131

(22) Filed: Aug. 20, 2002

(65) Prior Publication Data

US 2004/0036458 A1 Feb. 26, 2004

(51) Int. Cl.$^7$ ................................................. G05F 1/40
(52) U.S. Cl. ....................................................... 323/282
(58) Field of Search ................................ 323/282, 283, 323/284, 285

(56) References Cited

U.S. PATENT DOCUMENTS 5,912,552 A * 6/1999 Tateishi ........................ 323/285
6,188,206 B1 * 2/2001 Nguyen et al. ............. 323/222
6,229,292 B1 * 5/2001 Redl et al. ................... 323/285
6,313,616 B1   11/2001 Deller et al.
6,580,258 B2 * 6/2003 Wilcox et al. ............... 323/282
6,605,931 B2 * 8/2003 Brooks .......................... 323/272

* cited by examiner

Primary Examiner—Adolf Berhane
(74) Attorney, Agent, or Firm—W. Daniel Swayze, Jr.; W. James Brady; Frederick J. Telecky, Jr.

(57) ABSTRACT

A switching power supply or switching regulator is provided with a control circuit that controls a switching signal to a first switch. The switching signal is also coupled to a second switch in an inverted state, such as the first and second switches are switched "ON" and "OFF" in opposing states. The first switch and the second switch are coupled through a common node. The second switch is also coupled to ground. An inductor is coupled to the common node and an output capacitor. The switching signal generates an operating current through the inductor that charges the output capacitor to provide a regulated voltage at an output terminal. The second switch is designed to handle the small reverse current that occurs when the first switch is turned off preventing the regulator from entering a discontinuous mode during light load conditions.

20 Claims, 8 Drawing Sheets

NON-SYNCHRONOUS SWITCHING REGULATOR WITH IMPROVED OUTPUT REGULATION AT LIGHT OR LOW LOADS

TECHNICAL FIELD

The present invention relates to electrical circuits and more particularly to direct current (DC) to direct current (DC) power conversion and regulation.

BACKGROUND OF INVENTION

There is an ever increasing demand for power conversion and regulation circuitry to operate with increased efficiency and reduced power to accommodate the continuous reduction in size of electronic portable devices. Many times these devices are battery powered, and it is desirable to utilize as little power as possible to operate these devices, so that the battery life is extended. Therefore, the prior 5-volt industry standard has decreased to a 3.3 volt industry standard, which may soon be replaced by an even lower standard. Voltage regulators have been implemented as an efficient mechanism for providing a regulated output in power supplies. One such type of regulator is known as a switching regulator or switching power supply, which controls the flow of power to a load by controlling the on and off duty-cycle of one or more power switches coupled to the load. Many different classes of switching regulators exist today. One class of switching regulators is known as non-synchronous buck switching regulators. Non-synchronous buck switching regulators are subject to operating in a discontinuous mode under light or no load conditions. This undesirable result occurs when the current through the inductor is reduced to zero or near zero and then tends to stay at zero or near zero.

FIG. 1 illustrates a conventional switching regulator 10 (e.g., a non-synchronous buck converter). The switching regulator 10 includes a control circuit 12 that is operative to control the duty cycle of pulses provided to a power switch 14 through a driver 16. The control circuit 12 provides a pulse wave signal that is inverted by the driver 16. In the illustration of FIG. 1, the power switch 14 is an N-type MOSFET device. In order to turn on the N-type MOSFET device, the gate must be pulled higher than the source. A capacitor 18, referred to as a bootstrap capacitor or a boot cap, is coupled to the source of the power switch 14 and a diode 20. The diode 20 is also coupled to $V_{IN}$. The common node of capacitor 18 and the diode 20 is labeled BOOT1 and is also coupled to the supply input of driver 16 and to a resistor 22. The resistor 22 is representative of the load placed on the boot capacitor 18 by one or more level shifters (not shown) of the driver 16. The other end of resistor 22 is coupled to a node labeled PH1, the driver 16, and the source of power switch 14. The node PH1 is also coupled to the capacitor 18, an inductor 24 and a diode 26.

In order to turn on the power switch 14, an N-type MOSFET device, the gate must be pulled higher than the source. When $V_{PH1}$ is pulled to $V_{IN}$ through power switch 14, $V_{BOOT1}$ will be pulled to approximately $2*V_{IN}$. If $V_{BOOT1}$ is approximately $2*V_{IN}$, then the supply input to driver 16 will be at $2*V_{IN}$ allowing the output from the driver 16 and the gate of power switch 14 to be pulled higher than the source. When the input to the gate of power switch 14 is high, the source to drain input impedance will be low and the voltage at node PH1 ($V_{PH1}$) will be approximately equal to $V_{IN}$. When $V_{PH1}$, is approximately equal to $V_{IN}$, the inductor current $I_{L1}$ through inductor 24 will begin to increase. $I_{L1}$ continues to increase until $V_{PH1}$, changes.

When the output of the control circuit 12 goes high, the output of driver 16 goes low and the power switch 14 turns off. Since the current $I_{L1}$ through inductor 24 tends to remain unchanged, $V_{PH1}$ will be pulled below ground so that current $I_{L1}$ can be supplied through diode 26. At low loads, $I_{L1}$ decreases until it reaches approximately zero. When $I_{L1}$, reaches approximately zero, $V_{PH1}$ will approximately equal to $V_{OUT1}$, the voltage across a capacitor 28 and a load resistor 30. The inductor 24 tries to maintain $I_{L1}$ equal to zero. With $I_{L1}$, equal to zero and with no source driving node PH1, $V_{PH1}$ and $V_{OUT1}$ will ring (fluctuate up and down) until the next switching cycle when the power switch 14 is again turned on.

When $I_{L1}$ is equal to zero and the ringing described above occurs, the circuit is said to be operating in a discontinuous mode. The current through the inductor 24 is in the form of a triangle wave, increasing when power switch 14 is on and decreasing when power switch 14 is off. This triangle waveform is known as the ripple current. The decreasing portion of the triangle waveform is known as the reverse current. When an adequate minimum load exists, the current through the inductor will not reach zero because the triangle waveform (the ripple current) resides on top of a nominal load current level. However, under light or no load conditions, the inductor current $I_{L1}$ can reach zero when the negative ramp portion of the triangle reduces to zero. When this occurs, the circuit is said to be operating in the discontinuous mode and the fluctuating voltage (ringing) problems described above will occur.

FIG. 2 is a plot 40 of the voltage at node PH1 ($V_{PH1}$) versus time and a plot 42 of node BOOT1 ($V_{BOOT1}$) versus time. These plots are merely representative of the type of ringing and voltage fluctuations that can appear on these nodes and are not scale drawings with respect to frequency or amplitude. The scale has been altered to illustrate the problems herein discussed. Looking first to the plot 42, it can be seen that at T1 the voltage $V_{PH1}$ is approximately equal to $V_{IN}$ when power switch 14 is turned on. At T2, power switch 14 turns off. Since $I_{L1}$ tends to remain unchanged, $V_{PH1}$ is initially pulled below ground as diode 26 supplies $I_{L1}$. $I_{L1}$ decreases until reaching zero and after initially being pulled below ground, $V_{PH1}$, begins to ring and fluctuate above and below $V_{IN}$ until T3, when power switch 14 is again turned on and pulls $V_{PH1}$, to $V_{IN}$.

At the same time, $V_{BOOT1}$ exhibits similar behavior. At T2, when power switch 14 is turned off, $V_{BOOT1}$ rings and fluctuates in voltage along with $V_{PH1}$. At T3, when power switch 14 is turned on, $V_{BOOT1}$ stops ringing and the voltage at $V_{BOOT1}$ is initially equal to $2*V_{IN}$, but gradually decreases. With each successive cycle, the initial voltage of $V_{BOOT1}$ is slightly lower than the previous cycle and continues to decline during the period in which power switch 14 is on. $V_{BOOT1}$ continues to reduce each cycle until the boot cap 18 is eventually discharged and proper operation ceases.

FIG. 3 is a corresponding plot 44 of the output voltage $V_{OUT1}$ during this same time. $V_{OUT1}$ fails to regulate properly and continues to float higher until it eventually climbs to a value equal to $V_{IN}$, about twice the desired regulated output voltage. However, if the load current is greater than a minimum value, then $I_{L1}$ will not reduce to zero and the problems discussed above are avoided. For this reason, non-synchronous regulators are often limited to uses where there is a guaranteed minimum load. Synchronous regulators can be used in light load applications, however, synchronous regulators are often more expensive to produce.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to circuits and a method for providing a regulated output voltage at light or low loads from an unregulated input voltage, $V_{IN}$. A switching power supply or switching regulator (e.g., non-synchronous buck converter) is provided with a control circuit (e.g., a pulse width modulator, FM modulator, hysteretic device, pulse skipping device, programmed modulator) that controls a control signal to a first switch. The input control signal is also coupled to a second switch in an inverted state, such as the first and second switches are switched "ON" and "OFF" in opposing states. The first switch, referred to as the highside power switch or highside power FET, is coupled to a first voltage rail (e.g., an unregulated input voltage) and the second switch through a common node. The second switch, referred to as the lowside switch or lowside FET, is also coupled to a second voltage rail (e.g., ground). The highside switch is a power FET and the lowside switch is a weak FET. The lowside weak FET is designed to handle the small reverse current that occurs when the highside FET is turned off preventing the regulator from entering a discontinuous mode.

The method provides for turning the highside power switch and lowside switch in opposing "ON" and "OFF" states. When the highside power switch switches "ON", the lowside switch switches to an "OFF" state. A charging current is provided through an inductor to charge an output capacitor. When the highside power switch switches "OFF", the lowside switch switches to an "ON" state clamping the common node of the highside power switch and the inductor to ground. An initial discharging current is provided by a diode coupled between ground and the common node, since the inductor does not want to reduce the charging current to zero instantaneously. The lowside switch provides a path for the reverse current of the inductor caused by a light load condition. When the lowside switch turns on, it clamps the voltage of the common node to ground and provides a path for the reverse current. This prevents the circuit from operating in the discontinues mode. An additional diode, when placed in series between the common node and the lowside switch can prevent substrate injection from the lowside switch which can occur when the highside power switch switches to an "OFF" state and the inductor pulls the common node below ground.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention relates to circuits and a method for providing a regulated output voltage from an unregulated input voltage. The present invention provides for a non-synchronous switching power supply or regulator that regulates properly under light or low load conditions without a requirement for a guaranteed minimum load. The addition of a weak low-side MOSFET device provides a path for the reverse current (approximately ½ the ripple current) when the power switch is off and clamps the internal node that couples the inductor to the highside switch to ground. The lowside FET is much weaker than the highside FET and is not designed to carry the full operating current of the device. The addition of the lowside FET prevents the circuit from operating in the discontinuous mode where voltage ringing of internal nodes can occur under light or low load conditions and also provides an additional recharge path for a bootstrap capacitor (boot cap) to operate properly each cycle.

Figure 1:
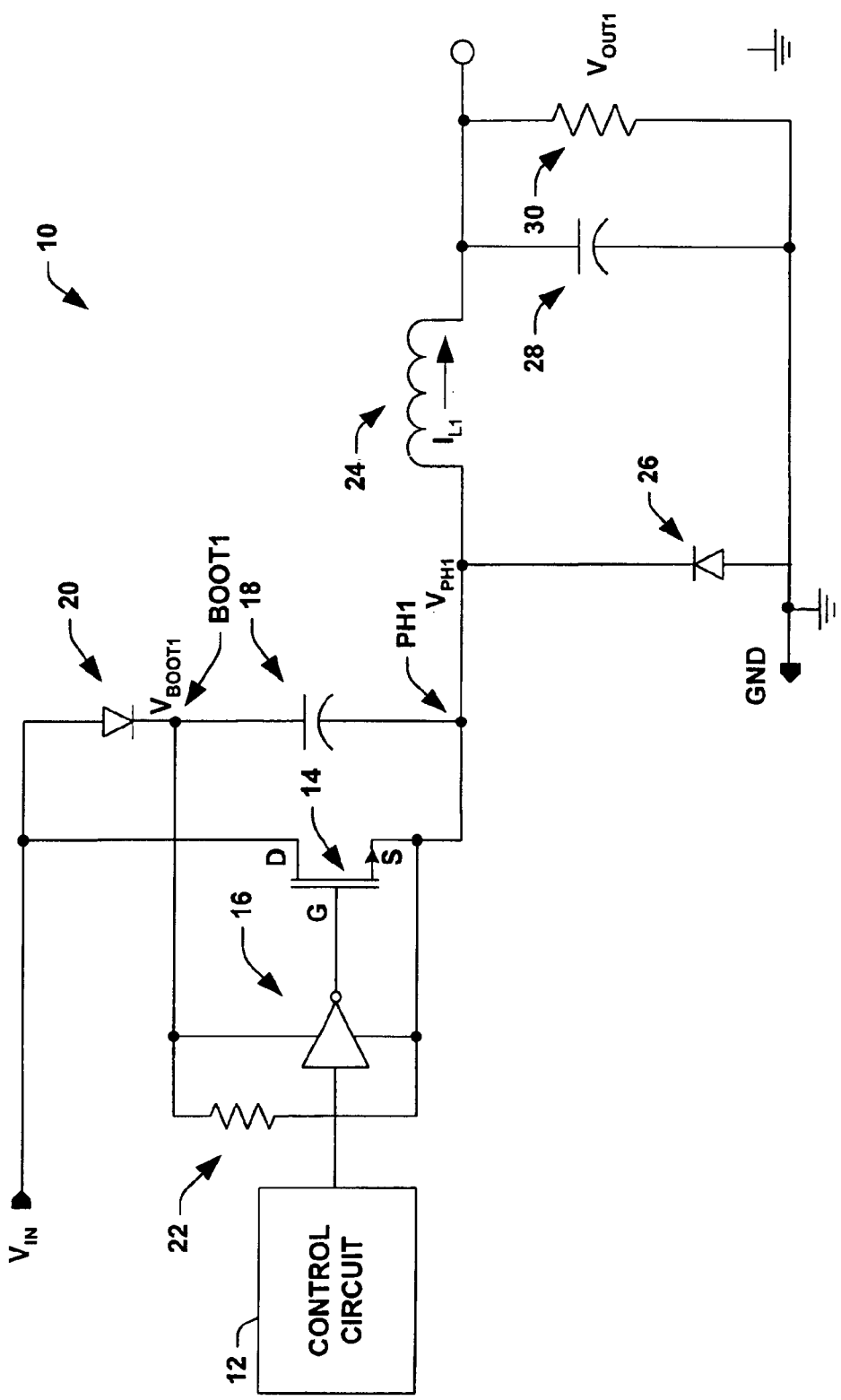
FIG. 1 illustrates a schematic block diagram of a prior art switching regulator.
Figure 2:
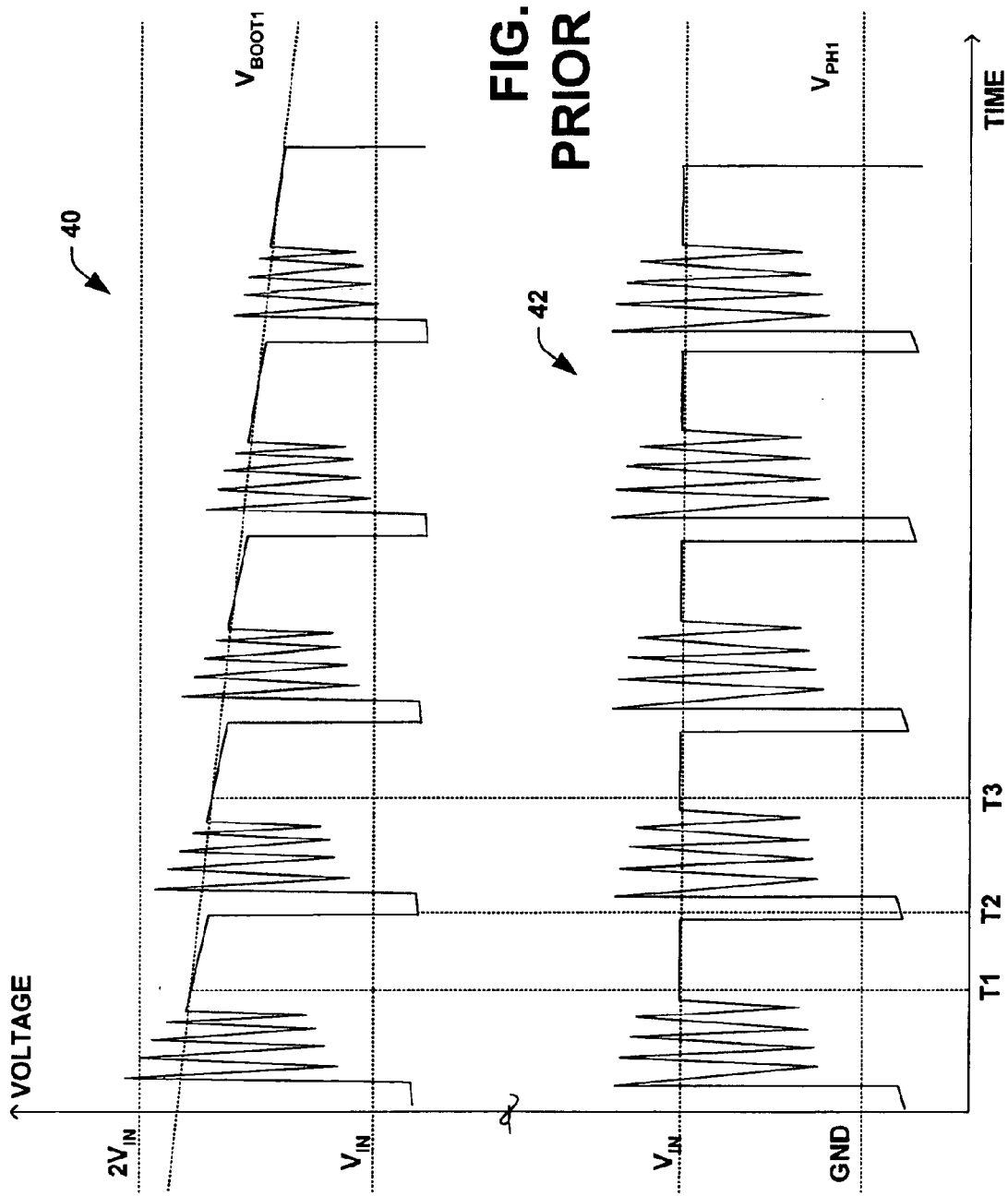
FIG. 2 illustrates a graph of the voltage waveforms of two internal nodes of the prior art switching regulator at light load.
Figure 3:
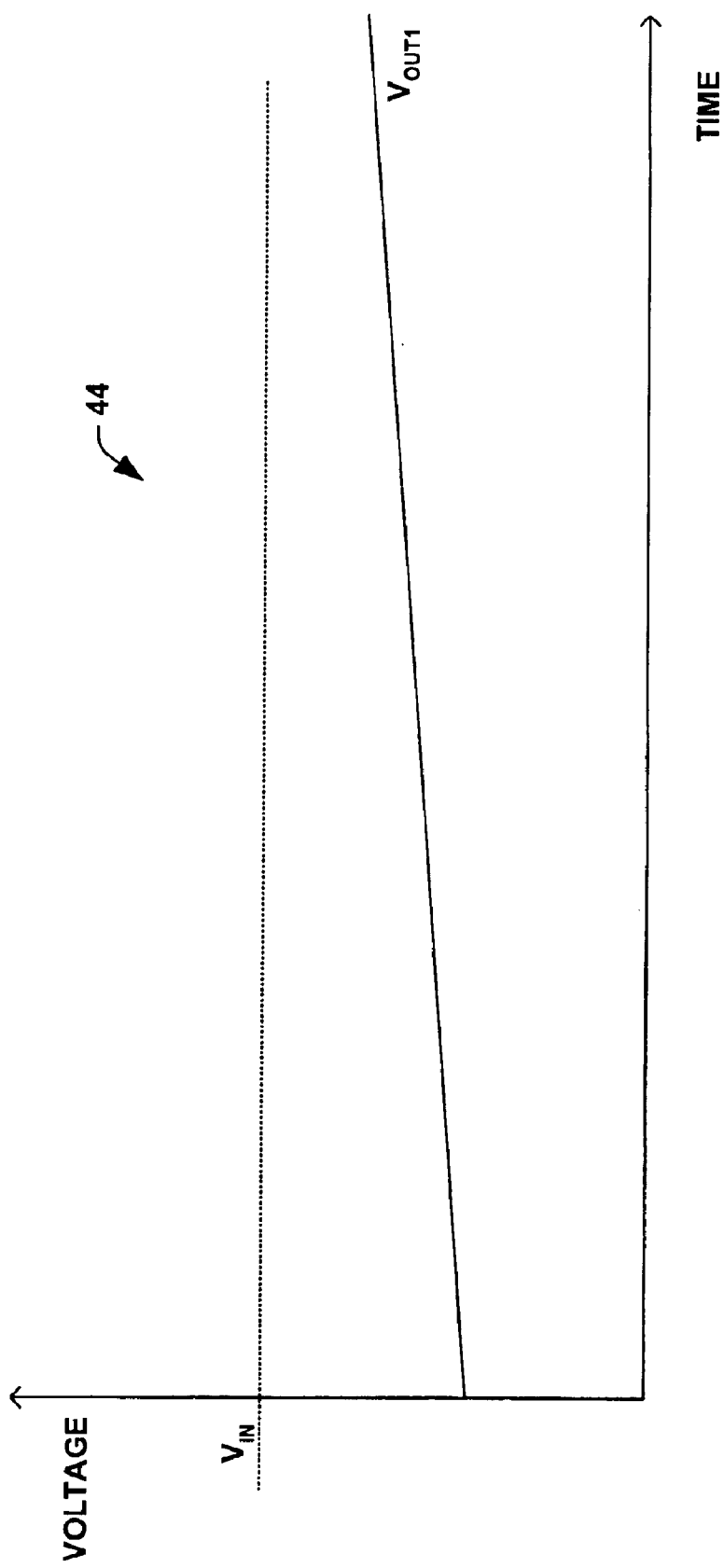
FIG. 3 illustrates a graph of the voltage output waveform of the prior art switching regulator at light load.
Figure 4:
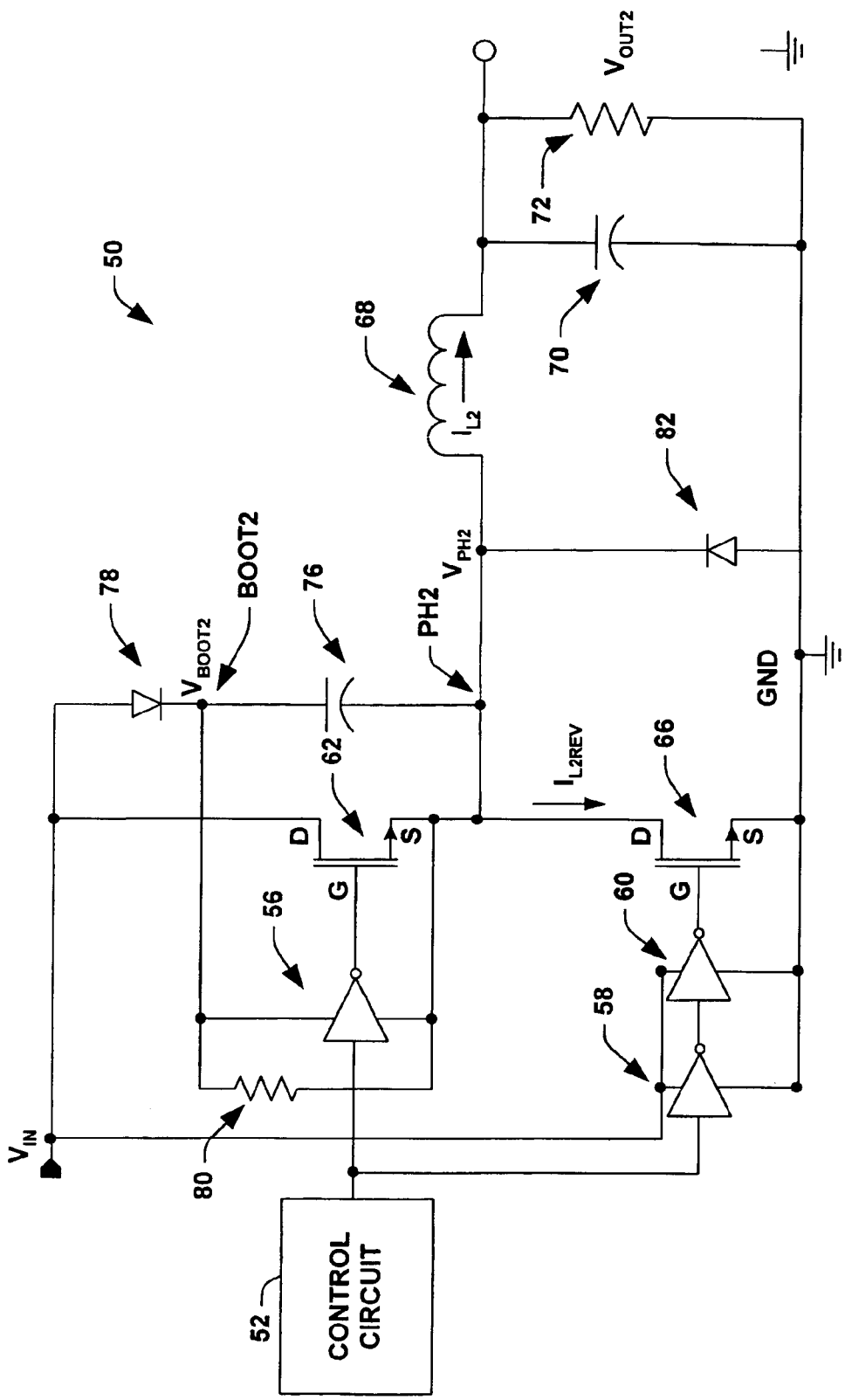
FIG. 4 illustrates a schematic block diagram of a switching regulator in accordance with an aspect of the present invention.

FIG. 4 illustrates a switching regulator 50 in accordance with an aspect of the present invention. The switching regulator 50 can be, for example, a non-synchronous buck converter. The switching regulator 50 includes a control circuit 52 (e.g., a pulse width modulator, FM modulator, hysteretic device, pulse skipping device, programmed modulator) that is operative to control the duty cycle of pulses provided to a driver 56 and a series of two inverters 58 and 60. The output of driver 56 is coupled to the gate of a highside power switch 62 and the output of inverter 60 is coupled to the gate of a weak lowside switch 66. In one aspect of the invention, the highside power switch 62 and the weak lowside switch 66 are N-type MOSFET devices coupled in series. The highside power switch can be any one of an Nmos device, a Pmos device, Dmos device, and a variety of other switching devices. It is to be appreciated that the highside power switch 62 can be an Nmos device, a Pmos device, a Dmos device, a bipolar device or a variety of other switching devices.

The highside power switch 62 is coupled to an input voltage ($V_{IN}$) at its drain terminal and a node PH2 at its source terminal. The weak lowside switch 66 is coupled to its drain terminal at the node PH2 and to ground at its source terminal. It is to be appreciated that the highside power switch 62 and the weak lowside switch 66 can be connected between any two highside and lowside voltage rails. The node PH2 is coupled to a primary inductor or winding 68, which provides the energy to charge a capacitor 70, coupled between inductor 68 and ground. $V_{OUT2}$ is measured across capacitor 70 and a load resistor 72 coupled across the capacitor 70.

The control circuit 52, driver 56 and inverters 58 and 60 cooperate to switch a control pulse or switching input signal between the highside power switch 62 and the weak lowside switch 66 in opposing states, causing the highside power switch 62 to turn "ON" and the weak lowside switch 66 to turn "OFF". The switching of the highside switch 62 and lowside switch 66 provides an input pulse signal, similar to a pulse wave, that toggles between $V_{IN}$ and ground at the node PH2. In one aspect of the invention, the highside switch 62 is turned on about 53% of the time pulling node PH2 to $V_{IN}$, and the lowside switch 66 is turned on about 47% of the time pulling node PH2 to ground. This provides an output voltage ($V_{OUT2}$) equivalent to about $V_{IN}$*0.53. For example, if $V_{IN}$ is about 5 volts then $V_{OUT2}$ would be about 2.65 volts. The highside switch 62 and the lowside switch 66 can employ additional non overlap circuits to prevent shoot-through (e.g., Both switches "ON" at the same time).

In FIG. 4, a bootstrap circuit is used to help turn on the highside power switch 62. It is to be appreciated that other types of control mechanisms can be employed based on the switch type utilized. The bootstrap circuit consists of a capacitor 76 coupled in series with a diode 78. One end of the capacitor 76 is coupled to node PH2 and the other end is coupled to a node BOOT2. The diode 78 is coupled between node BOOT2 and $V_{IN}$. In order to turn on the highside power switch 62, the gate must be pulled higher than the source, which is coupled to node PH2. The bootstrap circuit aids in this function. With the highside switch 62 off and the lowside switch 66 on, node PH2 will be at about ground and the voltage across the boot capacitor 76 will be approximately equal to $V_{IN}$. When the control circuit 52 changes state, the lowside switch 66 will turn off and the highside switch 62 will turn on. The node PH2 will then be pulled to approximately $V_{IN}$. Since the voltage across the boot capacitor 76 will not change instantaneously and is approximately equal to $V_{IN}$, node BOOT2 will rise to about 2*$V_{IN}$. Since the supply input to driver 56 is tied to the node BOOT2, the output of the driver 56 will pull or boost the gate of the highside switch 62 above $V_{IN}$ and keep the highside switch 62 turned on. A resistor 80 across the driver 56 represents the load that one or more level shifters (not shown) in the driver place on the boot capacitor 76.

The lowside switch 66 is substantially weaker than the highside switch 62. The lowside switch 66 is referred to as a "Weak Internal MOS Pull Down Field Effect Transistor" (WIMPFET) since it is not designed to carry the full operating current of the device. The WIMPFET 66 is designed to carry a small reverse current ($I_{L2REV}$) that occurs at light loads. The WIMPFET 66 is designed to carry about ½ the ripple current. As will be described, the WIMPFET 66 provides a path for the reverse current and clamps node PH2 to ground when the highside switch 62 is off. The result is that the regulator 50 does not enter the discontinuous mode under light load conditions and the ringing that occurs under light load conditions on node PH2 is avoided.

When the highside switch 62 is on and the lowside switch 66 is off, node PH2 will be at about $V_{IN}$ and the current $I_{L2}$ through inductor 68 increases over time (ramps up). The operating current $I_{L2}$ is pulled through the highside switch 62. When the control circuit changes states, the highside switch 62 turns off and the lowside WIMPFET 66 turns on. A diode 82 is coupled between ground and the node PH2. The anode of diode 82 is connected to ground and the cathode is connected to node PH2. Since $I_{L2}$ desires to remain constant, when the switches change state, node PH2 will be initially pulled below ground and $I_{L2}$ is supplied through diode 82. Since node PH2 is at or near ground, the current $I_{L2}$ through inductor 68 decreases over time (ramps down). The decrease in current (the reverse current $I_{L2REV}$) has a path through the WIMPFET 66 to ground. When the WIMPFET 66 is turned on, it pulls node PH2 to ground. Since the WIMPFET 66 provides a path for the reverse current $I_{L2REV}$ and provides positive control over node PH2 pulling it to ground, node PH2 no longer rings or fluctuates in voltage as it does without the presence of WIMPFET 66.

Figure 5:
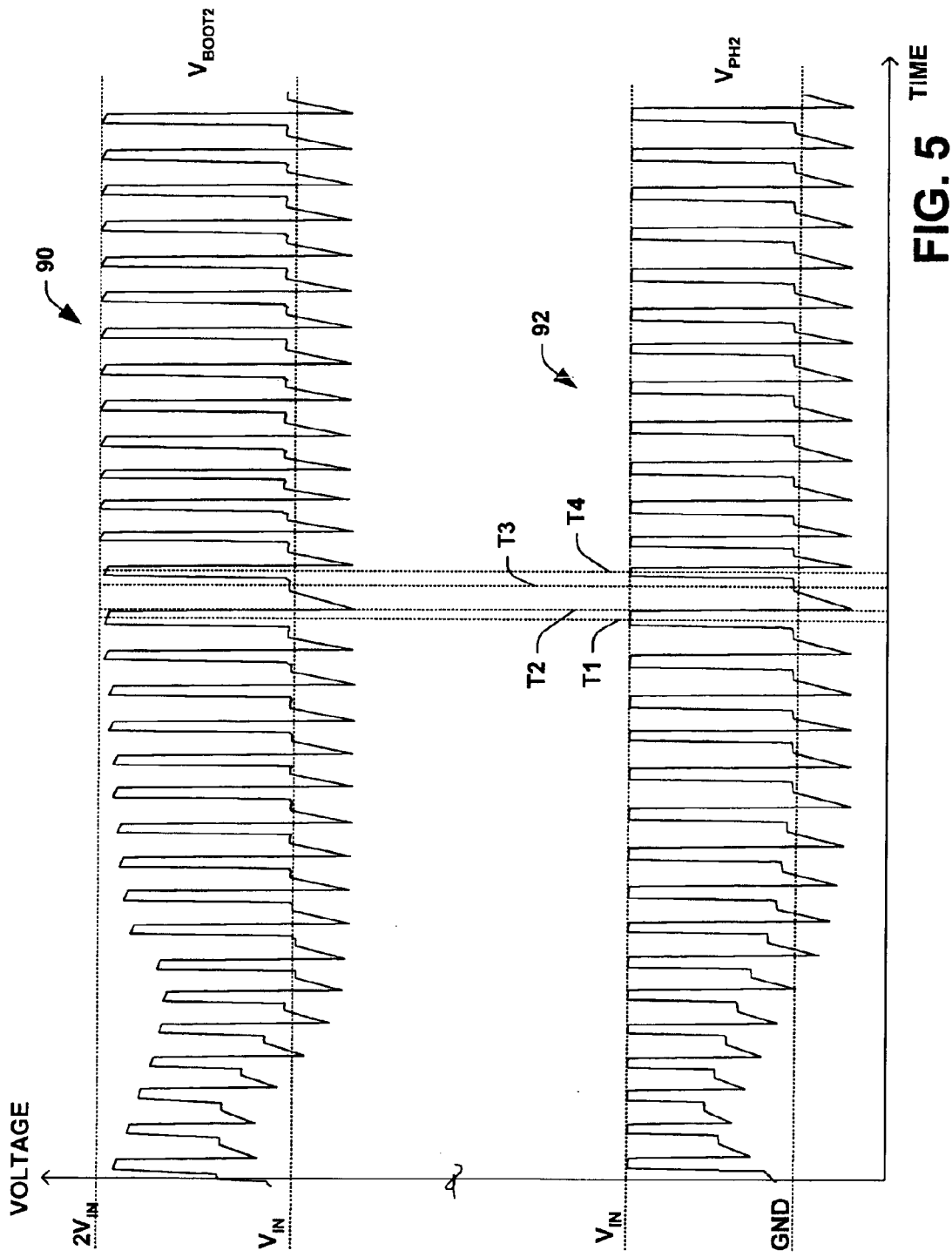
FIG. 5 illustrates a graph of the voltage waveforms of two internal nodes of a switching regulator in accordance with an aspect of the present invention.

FIG. 5 is a plot 90 of the voltage at node PH2 ($V_{PH2}$) versus time and a plot 92 at node BOOT2 ($V_{BOOT2}$) versus time. These figures are merely representative of the type of signals that appear on these nodes and are not scale drawings with respect to frequency and amplitude. The scale has been altered to illustrate the benefits of the present invention. Looking first to the plot 92, it can be seen that at T1 the voltage $V_{PH2}$ is approximately equal to $V_{IN}$ when the highside switch 62 is turned on. At T2, the highside switch 62 turns off and since $I_{L2}$ tends to remain unchanged, $V_{PH2}$ is initially pulled below ground as diode 82 supplies $I_{L2}$. WIMPFET 66 turns on and pulls $V_{PH2}$ to near ground. The WIPMFET 66 provides a path for the reverse current component $I_{L2REV}$ Of $I_{L2}$ and provides a positive voltage control over node PH2 such that it stabilizes at or near ground level at T3 instead of ringing and fluctuating as happens without the WIMPFET 66. The node PH2 remains at or near ground until the control circuit 52 again changes state at T4. At T4, the WIMPFET 66 is turned off and the highside switch 62 is turned on, pulling node PH2 back to $V_{IN}$.

At the same time, $V_{BOOT2}$ exhibits similar behavior as illustrated in plot 90. At T1, the highside switch 62 is turned on and $V_{BOOT2}$ is about 2*$V_{IN}$ At T2, the control circuit changes state and the highside switch 62 turns off and the low side switch 66 turns on. Since the voltage across the boot capacitor 76 will not change instantaneously, $V_{BOOT2}$ drops in similar fashion to $V_{PH2}$. At T3, $V_{BOOT2}$ spikes below $V_{IN}$ when $V_{PH2}$ spikes below ground. As the WIMPFET turns on and pulls $V_{PH2}$ to a level just above ground, $V_{BOOT2}$ stabilizes at a level just above $V_{IN}$. At T4, the control circuit changes state and the highside switch 62 turns on and the lowside WIMPFET 66 turns off. With the highside switch 62 on, $V_{PH2}$ is substantially shorted to $V_{IN}$ and $V_{BOOT2}$ is raised to a value of about 2*$V_{IN}$.

Referring again to FIG. 5, after a short period required for stabilization, not only is the ringing eliminated at both $V_{PH2}$ and $V_{BOOT2}$, but both voltages stabilize at nominal high and low values and the voltage differential between $V_{BOOT2}$ and $V_{PH2}$ no longer decays over time but is maintained at about $V_{IN}$. This ensures that the highside switch 62 continues to properly turn on. This is a result of WIMPFET 66 providing a recharge path for the bootstrap capacitor 76.

Figure 6:
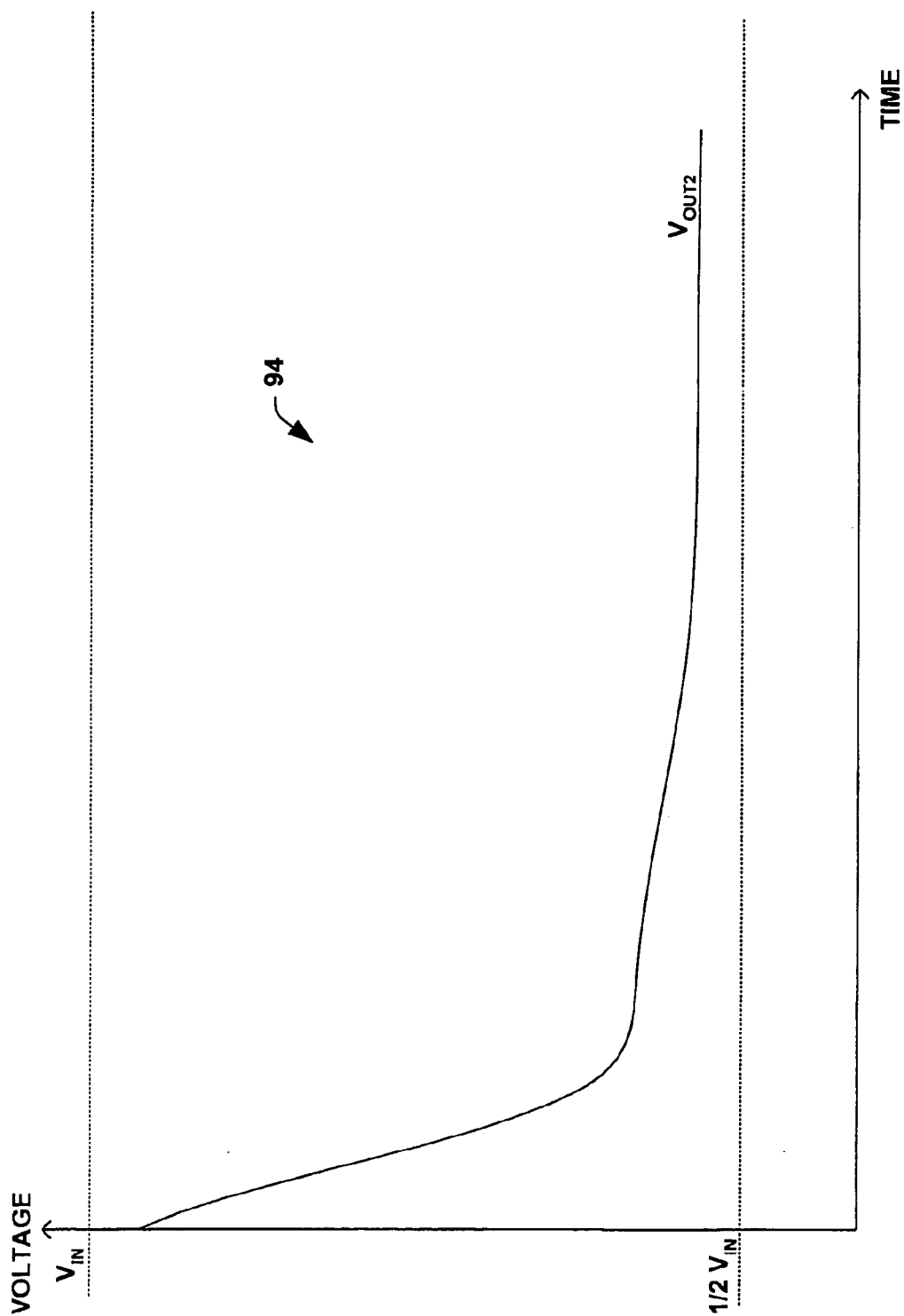
FIG. 6 illustrates a graph of the voltage output waveform of a switching regulator recovering from an overvoltage event on the output in accordance with an aspect of the present invention.

FIG. 6 illustrates a graph 94 of the voltage output waveform of the switching regulator recovering from an overvoltage event on the output in accordance with an aspect of the present invention. It can be seen that $V_{OUT2}$ rapidly regulates to the proper level and maintains that level once the circuit stabilizes. FIG. 6 illustrates that a properly chosen WIMPFET results in an output that properly regulates to the desired output even under light load conditions during an overvoltage event. The WIMPFET provides a path for the reverse current and inhibits the circuit from entering a discontinuous mode. The additional recharge path for the bootstrap capacitor 76 ensures that the capacitor recharges properly and continues to provide a proper input to keep the highside switch 62 operating properly.

Figure 7:
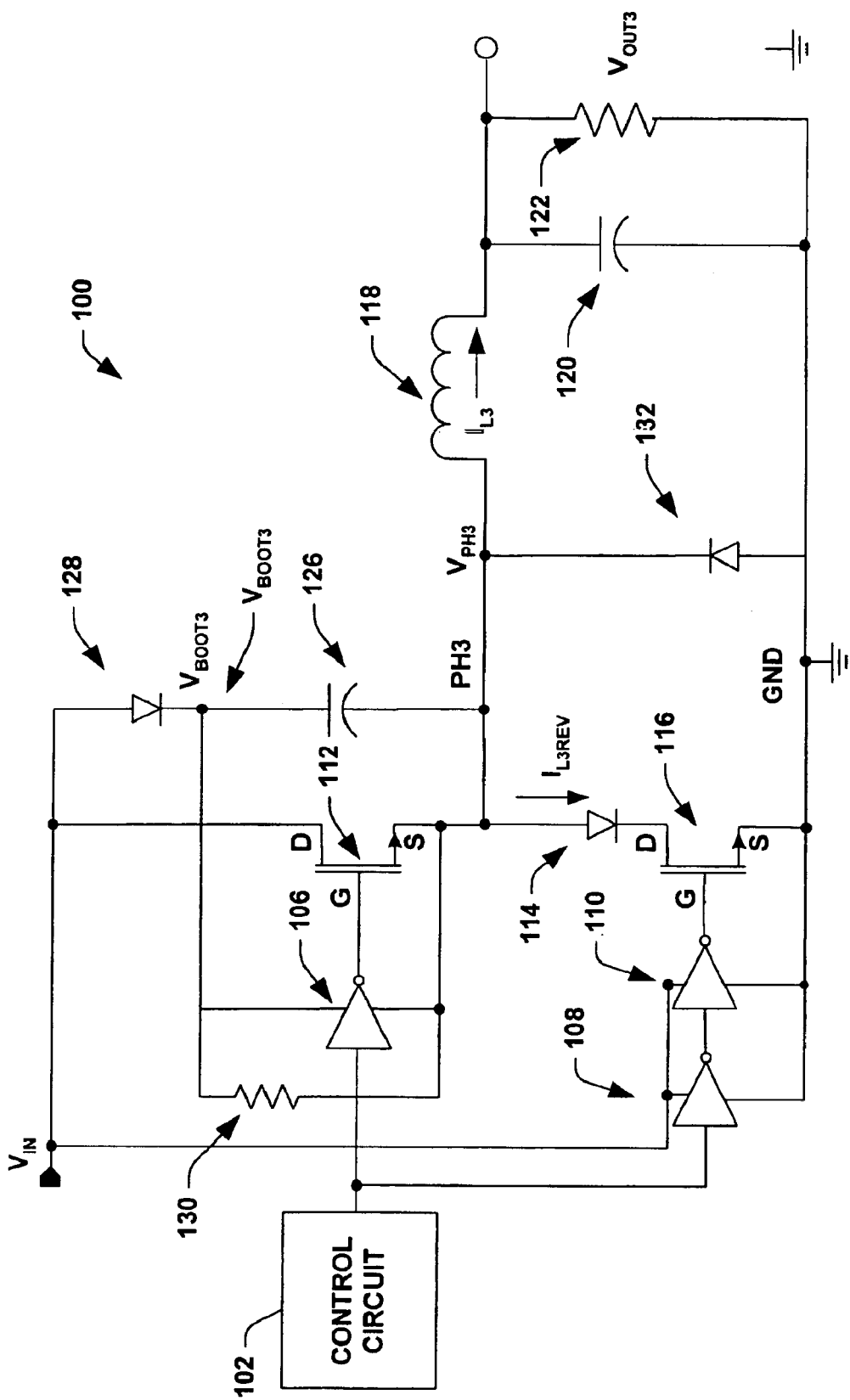
FIG. 7 illustrates a schematic block diagram of an alternate switching regulator in accordance with another aspect of the present invention.

In one aspect of the invention, the addition of a diode in series between a lowside FET and a highside FET of a switching regulator (e.g., non-synchronous buck converter) prevents substrate injection that can occur from the lowside FET when the inductor pulls the internal node that couples the inductor to the highside switch below ground. FIG. 7 illustrates an alternate switching regulator 100 in accordance with another aspect of the present invention. The switching regulator 100 can be, for example, a non-synchronous buck converter. The switching regulator 100 includes a control circuit 102 (e.g., a pulse width modulator, FM modulator, hysteretic device, pulse skipping device, programmed modulator) that is operative to control the duty cycle of pulses provided to a driver 106 and a series of two inverters 108 and 110. The output of driver 106 is coupled to the gate of a highside power switch 112 and the output of inverter 110 is coupled to a gate of a weak lowside switch 116. In one aspect of the invention, the highside power switch 112 and the weak lowside switch 116 are N-type MOSFET devices.

The highside power switch 112 and the weak lowside switch 116 are coupled in series by a diode 114. The diode 114 serves to prevent substrate injection from the lowside switch 116 when node PH3 is pulled below ground. The highside power switch 112 is coupled to an input voltage ($V_{IN}$) at its drain terminal and a node PH3 at its source terminal. The anode of the diode 114 is coupled to the node PH3 and the cathode of the diode is coupled to the drain of the weak lowside switch 116. The weak lowside switch 116 is coupled with its drain terminal to diode 114 and to ground at its source terminal. The node PH3 is coupled to a primary inductor or winding 118, which provides the energy to charge a capacitor 120, coupled between the inductor 118 and ground. $V_{OUT3}$ is measured across capacitor 120 and a load resistor 122 coupled across the capacitor 120.

The control circuit 102, the driver 106 and the inverters 108 and 110 switch a control pulse or switching signal between the highside power switch 112 and the lowside weak switch 116 in opposing states, causing the highside power switch 112 to turn "ON" and "OFF" and the lowside weak switch 116 to turn "OFF" and "ON". The switching of the highside and lowside switches 112 and 116 provides an input pulse signal, similar to a pulse wave, that toggles between $V_{IN}$ and ground at the node PH3. In one aspect of the invention, the highside switch 112 is turned on about 53% of the time pulling node PH3 to $V_{IN}$, and the lowside switch 116 is turned on about 47% of the time pulling node PH3 to ground. This provides an output voltage ($V_{OUT3}$) equivalent to about $V_{IN}*0.53$. For example, if $V_{IN}$ is about 5 volts then $V_{OUT3}$ would be about 2.65 volts.

In FIG. 7, a bootstrap circuit is used to help turn on the highside power switch 112. The bootstrap circuit consists of a capacitor 126 coupled in series with a diode 128. One end of capacitor 126 is coupled to the node PH3 and the other end is coupled to a node BOOT3. The diode 128 is coupled between the node BOOT3 and an input voltage $V_{IN}$. In order to turn on highside power switch 112, the gate must be pulled higher than the source, node PH3. The bootstrap circuit aids in this function. With the highside switch 112 off and the lowside switch 116 on, node PH3 will be at ground and the voltage across the boot capacitor 126 will be equal to approximately $V_{IN}$. When control circuit 102 changes state, the lowside switch 116 will turn off and the high side switch 112 will turn on. Node PH3 will be pulled to about $V_{IN}$. Since the voltage across the boot capacitor 126 will not change instantaneously and is equal to $V_{IN}$, node BOOT3 will rise to $2 * V_{IN}$. Since the supply input to driver 106 is tied to node BOOT3, the output of driver 106 will pull the gate of highside switch 112 above $V_{IN}$ and keep the highside switch 112 turned on. Resistor 130 across driver 106 represents the load that level shifters (not shown) in the driver place on the boot capacitor 126.

The lowside switch 116 is a much weaker than the highside switch 112. The lowside switch 116 is designed to carry the small reverse current that occurs at light loads (e.g., about ½ the ripple current). The lowside switch 116 provides a path for the reverse current and clamps node PH3 to ground when the highside switch 112 is off, thus, mitigating the deleterious effects of a discontinuous mode and ringing under light load conditions.

When the highside switch 112 is on and the lowside switch 116 is off, node PH3 will be at approximately $V_{IN}$ and the current $I_{L3}$ through inductor 118 increases over time (ramps up). The operating current $I_{L3}$ is pulled through the highside switch 112. When the control circuit changes states, the highside switch 112 turns off and the lowside switch 116 turns on. A diode 132 is coupled between ground and the node PH3. The anode of diode 132 is connected to ground and the cathode is connected to node PH3. Since $I_{L3}$ wants to remain constant, when the switches change state, node PH3 will initially be pulled below ground and $I_{L3}$ is supplied through the diode 132. The diode 114 has been placed between node PH3 and the lowside switch 116 to prevent the WIMPFET drain from being pulled below ground. The diode 114 serves to prevent substrate injection from the lowside switch 116 when node PH3 is pulled below ground. It is to be appreciated that not all processes have problems with substrate injection, such as a field isolated substrate.

With node PH3 at or near ground, the current $I_{L3}$ through inductor 118 decreases over time (ramps down). The decrease in current (the reverse current $I_{L3REV}$) has a path through the lowside switch 116 to ground. When the lowside switch 116 is turned on, it pulls node PH3 to ground. Since the lowside switch 116 provides a path for the reverse current $I_{L3REV}$ and provides positive control over node PH3 pulling it to ground, node PH3 no longer rings or fluctuates in voltage as it does without the presence of lowside switch 116.

Figure 8:
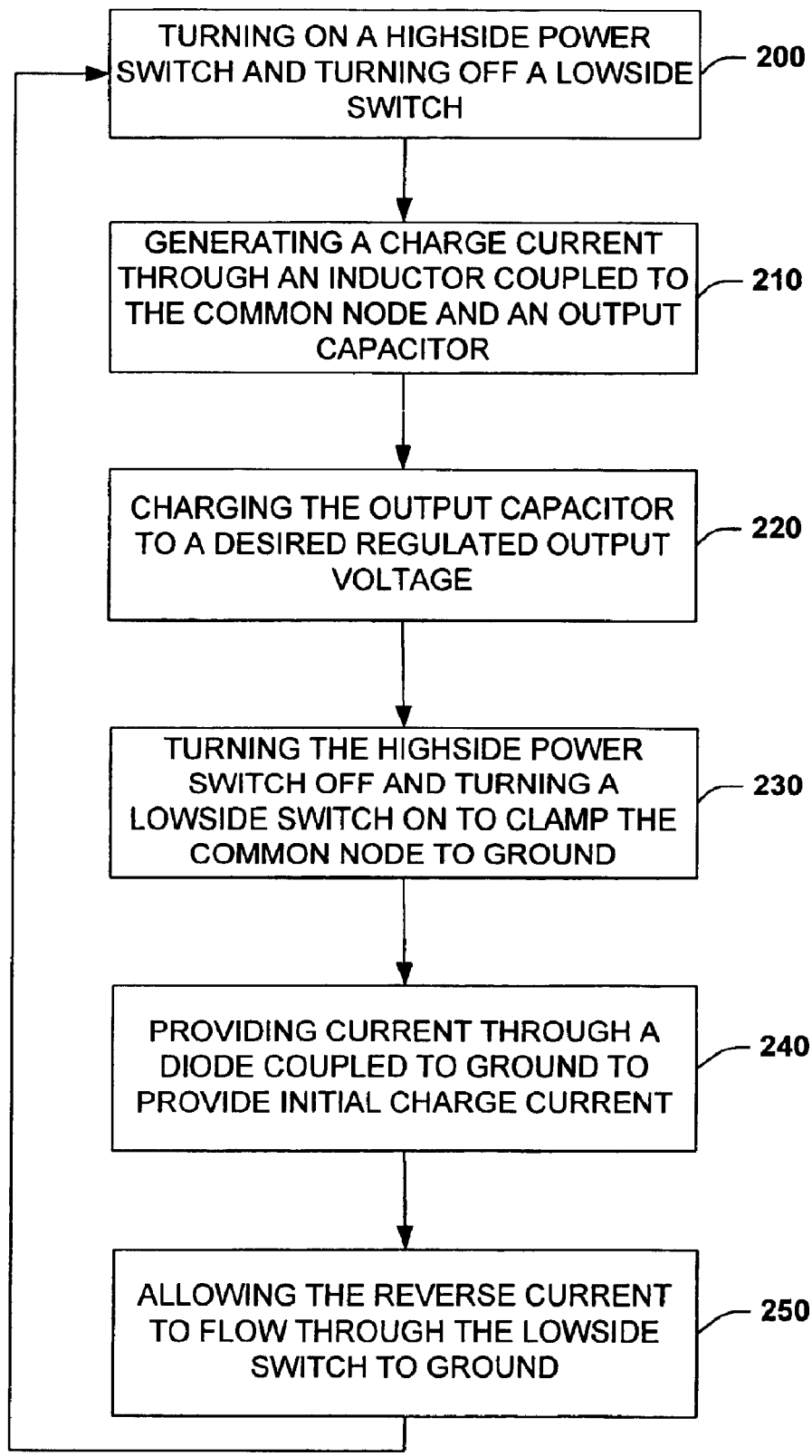
FIG. 8 illustrates a flow diagram of a methodology for operating a switching regulator in accordance with an aspect of the present invention.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 8 illustrates one particular methodology for operating a non-synchronous switching regulator that regulates properly and operates in the continuous mode without a requirement for a guaranteed minimum load. The methodology begins at 200 where a highside power switch (e.g., a power FET) coupled between a highside voltage rail or input voltage and a common node is turned to an "ON" state and a lowside switch (e.g., a weak FET) coupled to the common node and a ground or a lowside voltage rail is turned to an "OFF" state. The highside power switch and the lowside switch are switched between opposing "ON" and "OFF" states by a control circuit, such as a pulse width modulator. A charge current is then generated through an inductor coupled to the common node and an output capacitor at 210. At 220, the output capacitor is charged to a desired regulated output voltage. The methodology then proceeds to 230.

At 230, the highside power switch is turned to an "OFF" state and the lowside switch is turned to an "ON" state. The lowside switch clamps the common node to ground or the lowside voltage rail, in addition to providing a path for the reverse current of the inductor caused by a light or low load on the output capacitor. By providing a path for reverse current, ringing at the common node is mitigated, thus, preventing the regulator from entering a discontinuous mode. The lowside switch is selected to handle a reverse current of about ½ a ripple current through the inductor. At 240, current is provided through a diode coupled to ground to provide initial charge current through the inductor, since the inductor does not want to change the current instantaneously to zero. At 250, the reverse current through the inductor is allowed to flow through the lowside switch to ground or the lowside rail voltage. The methodology then returns to 200 to turn the highside power switch back to the "ON" state and the lowside switch to the "OFF" state to repeat the process.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A switching regulator comprising:
   a highside power switch and a lowside switch coupled in series, the highside power switch coupled to a first voltage rail and the lowside switch coupled to a second voltage rail;
   an inductor coupled to a node between the highside power switch and the lowside switch and an output capacitor; and
   a control circuit that provides a switching signal to the highside power switch resulting in the generation of an operating current through the inductor that charges the output capacitor to provide a regulated voltage at an output terminal, the lowside switch provides a path for a reverse current that occurs at light loads on the output terminal
   wherein the lowside switch being substantially weaker than the highside power switch.

2. The switching regulator of claim 1, the highside power switch and the lowside switch being N-type MOSFET devices.

3. The switching regulator of claim 1, the lowside switch is sized to handle a reverse current of about ½ a ripple current through the inductor.

4. The switching regulator of claim 1, the switching signal controlling the switching of turning the highside power switch "ON" while turning the lowside power switch "OFF", and turning the highside power switch "OFF" while turning the lowside power switch "ON".

5. The switching regulator of claim 4, the operating current is provided by the highside power switch when the highside power switch is in an "ON"state and the lowside power switch is in an "OFF" state, the operating current is provided initially by a diode coupled between the node and the second voltage rail when the highside power switch is in an "OFF" state and the lowside power switch is in an "ON" state, the lowside power switch pulling the node to the second voltage rail to mitigate ringing at the node when the operating current through the inductor decreases below zero.

6. The switching regulator of claim 1 being a non-synchronous buck converter.

7. The switching regulator of claim 1, further comprising a bootstrap circuit coupled to the highside switch that facilitates the turning "ON" of the highside power switch by pulling the input signal above the node.

8. The switching regulator of claim 1, further comprising a diode located between the lowside switch and the highside power switch, the diode mitigating subtrate injection that occurs when the inductor pulls the node below the second voltage rail.

9. A non-synchronous switching regulator comprising:
   a highside power Field Effect Transistor (FET) coupled to an input voltage and a common node;
   a weak lowside FET coupled to a ground;
   a first diode with an anode coupled to the common node and a cathode coupled to the weak lowside FET;
   a second diode with an anode coupled to ground and a cathode coupled to the common node;
   an inductor coupled to the common node and an output capacitor; and
   a control circuit operative to control a duty cycle of an input signal provided to the highside power FET and the weak lowside FET resulting in the generation of a charge current through the inductor that charges the output capacitor to provide a regulated voltage at an output terminal, the lowside FET provides a path for a reverse current to prevent the regulator from entering a discontinuous mode that occurs at light loads on the output terminal.

10. The switching regulator of claim 9, the highside power FET and the weak lowside FET comprising N-type MOSFET devices.

11. The switching regulator of claim 9, the weak lowside FET is selected to handle a reverse current of about ½ the ripple current through the inductor.

12. The switching regulator of claim 9, the first diode inhibits the weak lowside FET from substrate injection that occurs when the inductor pulls the common node below ground.

13. The switching regulator of claim 9, the second diode is selected to provide the charge current when the highside power FET enters an "OFF" state and the weak Lowside FET enters an "ON" state.

14. The switching regulator of claim 9, the control circuit being one of a pulse width modulator, FM modulator, hysteretic device, pulse skipping device and a programmed modulator.

15. The switching regulator of claim 9 being a non-synchronous buck converter.

16. The switching regulator of claim 9, further comprising a bootstrap circuit coupled to the highside power FET that pulls the input signal to the gate of the highside power FET above the source of the highside power FET when the highside power FET enters an "ON" state, the second diode providing a recharge path for a capacitor of the bootstrap circuit.

17. The switching regulator of claim 9, the input signal controls the switching of turning the highside power FET and the weak lowside FET between opposing "ON" and an "OFF" states.

18. A method of operating a non-synchronous switching regulator, the method comprising;
   switching a highside power switch coupled to an input voltage and a common node to an "ON" state;
   switching a lowside switch coupled to a ground and the common node to an "OFF" state;
   generating a charge current through an inductor coupled to the common node and an output capacitor;
   charging the output capacitor to a desired regulated output voltage;

switching the highside power switch to an "OFF" state and the lowside switch to an "ON" state;

providing an initial charging current to the inductor through a diode coupled to ground; and allowing a reverse current of the inductor to flow through the lowside switch to ground, wherein the lowside switch being substantially weaker than the highside power switch.

19. The method of claim 18, the highside power switch and the lowside switch being switched between opposing "ON" and "OFF" states concurrently.

20. The method of claim 18, the lowside switch is selected to handle a reverse current of about ½ a ripple current through the inductor.

* * * * *